(12) United States Patent
Sato et al.

(10) Patent No.: US 6,781,622 B1
(45) Date of Patent: Aug. 24, 2004

(54) APPARATUS FOR CORRECTION BASED UPON DETECTING A CAMERA SHAKING

(75) Inventors: Yasuhiro Sato, Hadano (JP); Takashi Kitaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/340,395

(22) Filed: Jun. 28, 1999

(30) Foreign Application Priority Data

Jun. 26, 1998 (JP) .......................................... 10-180488

(51) Int. Cl.⁷ ............................................. H04N 5/228
(52) U.S. Cl. ............................ 348/208.4; 348/208.99; 348/208.1; 348/208.3; 348/208.5; 348/208.6; 348/208.7; 348/208.8; 348/208.11
(58) Field of Search ........................ 348/208.99, 208.1, 348/208.2, 208.3, 208.4, 208.5, 208.6, 208.7, 208.8, 208.11, 208.12, 208.13, 208.14, 208.15, 208.16

(56) References Cited

U.S. PATENT DOCUMENTS

| | | | |
|---|---|---|---|
| 4,734,726 A | | 3/1988 | Takahashi et al. |
| 5,155,520 A | * | 10/1992 | Nagasaki et al. ............. 396/53 |
| 5,309,190 A | * | 5/1994 | Shinohara et al. ............ 396/55 |
| 5,649,237 A | * | 7/1997 | Okazaki ........................ 396/55 |
| 6,035,133 A | * | 3/2000 | Shiomi .......................... 396/55 |
| 6,130,709 A | * | 10/2000 | Sekine et al. ............. 348/208.8 |
| 6,486,910 B1 | * | 11/2002 | Kaneda et al. ......... 348/208.99 |
| 2001/0014171 A1 | * | 8/2001 | Iijima et al. ................. 382/154 |

FOREIGN PATENT DOCUMENTS

| | | |
|---|---|---|
| JP | 01-223413 | 9/1989 |
| JP | 03-145880 | 6/1991 |
| JP | 04-37268 | 2/1992 |
| JP | 04-86730 | 3/1992 |
| JP | 04-95933 | 3/1992 |
| JP | 04-211230 | 8/1992 |
| JP | 5-173219 A | * 7/1993 ............ G03B/5/00 |
| JP | 8-101418 A | * 4/1996 ............ G03B/5/00 |

OTHER PUBLICATIONS

Patent Abstracts of Japan, Japanese Laid Open Patent Application 09–80,502; filed Mar. 28, 1997; Hirano Shinichi; (2 pages).
Patent Abstracts of Japan, Japanese Laid Open Patent Application 08–313,955; filed Nov. 29, 1996; Ishida Tokuji et al.; (2 pages).
Patent Abstracts of Japan, Japanese Laid Open Patent Application 08–101,418; filed Apr. 16, 1996; Washisu Koichi et al.; (2 pages).
Patent Abstracts of Japan, Japanese Laid Open Patent Application 07–225–405; filed Aug. 22, 1995; Okazaki Mitsuhiro; (2 pages).
Patent Abstracts of Japan, Japanese Laid Open Patent Application 07–218–956; filed Aug. 18, 1995; Amanuma Tatsuo et al.; (2 pages).
Patent Abstracts of Japan, Japanese Laid Open Patent Application 07–177,419; filed Jul. 14, 1995; Sakuta Takeshi et al.; (2 pages).
Patent Abstracts of Japan, Japanese Laid Open Patent Application 07–020,547; filed Jan. 24, 1995; Nishida Toru; (2 pages).

(List continued on next page.)

*Primary Examiner*—Andrew Christensen
*Assistant Examiner*—Brian Genco
(74) *Attorney, Agent, or Firm*—Oblon, Spivak, McClelland, Maier & Neustadt, P.C.

(57) ABSTRACT

An apparatus for detecting a deviation of a camera as a result of a shaking. The apparatus includes a shaking detector which detects a deviation of the camera from shaking based upon an output of at least two pairs of acceleration sensors which are located on different axes of the camera coordinates. A calculator calculates tilt angles of each of the axes from outputs of the pairs of the acceleration sensors.

22 Claims, 8 Drawing Sheets

OTHER PUBLICATIONS

Patent Abstracts of Japan, Japanese Laid Open Patent Application 06–153,064; filed May 31, 1994; Sugimori Masami et al.; (2 pages).

Patent Abstracts of Japan, Japanese Laid Open Patent Application 05–173,219; filed Jul. 13, 1993; Nishida Toru; (2 pages).

Patent Abstracts of Japan, Japanese Laid Open Patent Application 05–040–291; filed Feb. 19, 1993; Shinohara Junichi et al; (2 pages).

Article from Canon U.S.A., Inc's web site "http://www.usa.canon.com/indtech/broadcasteq/vaplens.html"; entitled: "Canon's Optical Image Stabilizer Lenses Shake Up the Industry"; (3 pages).

Artilce re: distances L, L'; "Point to note and how to use of optical device in order to use the optelectronics technique," Tetsuo Sueda, Optelectronics, pp. 36–37.

* cited by examiner

APPARATUS FOR CORRECTION BASED UPON DETECTING A CAMERA SHAKING

BACKGROUND OF THE INVENTION

1. Field of the Invention

This invention is generally related to an apparatus and a method for correction based upon detecting a deviation from a proper position of a camera, and more particularly is related to an apparatus for correcting deviation from the proper camera position caused by shaking, such as hand shaking, detected by pairs of acceleration sensors.

2. Background of the Invention

Certain cameras have a function of correcting deviation caused by a slight oscillation based on a hand of an operator holding the camera shaking or by another cause for making the camera shake.

There are some methods for detecting a camera shaking, and such methods utilize devices such as angular velocity sensors, such as a piezoelectric gyro sensor, an acceleration sensor, and an optically detecting sensor. As another method for correcting a camera shaking, an image processing method is also known. The most popular method for addressing camera shaking utilizes a piezoelectric gyro sensor for detecting a rotary motion of the camera body. Furthermore, detecting methods which utilize combinations of the above devices have also been suggested.

When a camera employs a piezoelectric gyro sensor, the piezoelectric gyro sensor detects angular velocity around two axes. After the detection of the angular velocity, an optical system of the camera is adjusted along each axis, a vari-angle control mechanism adjusts a variable rotation angle (Vari-Angle) prism, a reflection mirror in the optical system is adjusted, an image sensing device is moved by a motor, etc. The piezoelectric gyro sensor as an angular velocity sensor which detects the angular velocities along each of the plural axes has been commercialized in a camera.

A method for detecting angular velocity by pairs of acceleration sensors is disclosed in Japanese Laid Open Patent Application 8-101,418 and Japanese Laid Open Patent Application 05-173,219. In the methods disclosed in those documents, the angular acceleration is detected by differential amplifying an output of plural acceleration sensors.

However, the present inventor has realized that the piezoelectric gyro sensor detects the deviation of the camera based upon a resonant of a piezoelectric device, such as a PZT. Therefore, in the system employing the piezoelectric gyro sensor, the system needs a driving circuit which consumes a high power, and a size of the device becomes big as a result of needing that type of driving circuit.

On the other hand, it is easy to accumulate acceleration sensors because an acceleration sensor may utilize a semiconductor production technology by a silicon process. Accordingly, when utilizing accelerator sensors, consumption of electric power is smaller compared with utilizing the piezoelectric gyro sensor, and the size of the device becomes small.

An up-and-down motion of the camera relative to the direction of the optical axis and a side-to-side motion of the camera relative to the direction of the optical axis have the greatest influence on the camera shaking. However, the system disclosed in Japanese Laid Open Patent Application 05-173,219 has only one pair of acceleration sensors and cannot fully detect both these types of movements.

In Japanese Laid Open Patent Application 08-101,418, a system that has plural pairs of acceleration sensors is disclosed. That document, however, does not disclose how to detect and correct for a camera shaking.

Therefore, the above-noted background art systems can not correct for camera shaking based upon rotation based on an up-and-down motion and a side-to-side motion relative to the direction of the optical axis.

SUMMARY OF THE INVENTION

Accordingly, one object of the present invention is to provide a novel system for correcting for any adverse influences generated by a camera shaking.

A more specific object of the present invention is to provide a novel system which overcomes the drawbacks in the background art as noted above.

To solve the above-noted and other problems, according to one aspect of the present invention, an apparatus for detecting a deviation of a camera shaking includes a shaking detector which detects a deviation of the camera shaking based upon an output of at least two pairs of acceleration sensors which are located on axes of the camera coordinates, and a calculator for calculating tilt angles of each of the axes based on the output of the pairs of the acceleration sensors.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
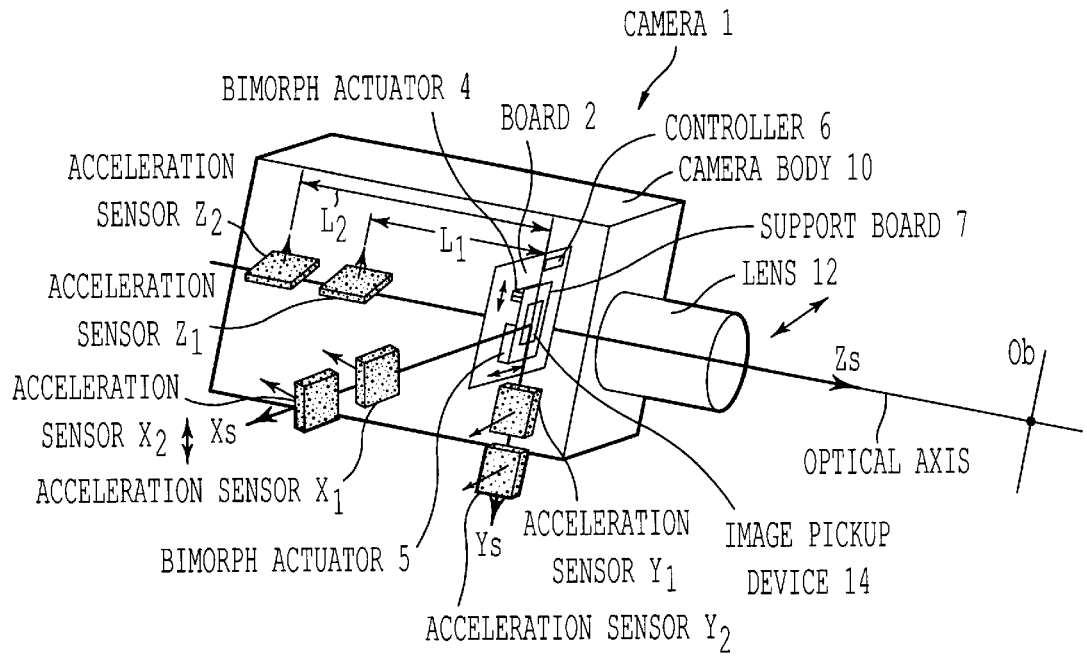
FIG. 1(a) is a perspective view of a camera according to a first embodiment of the present invention.

A description will now be given of preferred embodiments according to the present invention by referring now to the drawings, wherein like reference numerals designate identical or corresponding structures throughout the views.

FIG. 1 shows one preferred embodiment of a camera 1 with a correction mechanism for correcting for camera shaking according to the present invention.

The camera 1 includes a camera body 10 and a lens 12. A pair of acceleration sensors X1, X2, a pair of acceleration sensors Y1, Y2, a pair of acceleration sensors Z1, Z2, an image pickup device 14, a board 2 equipped with a controller 6, and actuators 4, 5 are set up in the camera body 10. In this embodiment, the image pickup device 14 employs a 2-dimensional CCD. The CCD 14 is supported on a support board 7 located on the board 2 via Bimorph actuators 4 and 5.

The camera 1 brings into focus a target object in which is located an object position (Ob). The image corresponding to the target object is in focus at an imaging surface of the CCD 14 by lens 12.

The pair of acceleration sensors Z1, Z2 is located on the optical axis. The camera coordinate system is defined such that the direction of the optical axis is the Zs axis, the gravity direction is the Ys axis, and the horizontal direction perpendicular to both the Zs axis and the Ys axis is the Xs axis. In the above camera coordinate system, the point of origin is at a center of the imaging surface of the CCD 14.

When an operator holds the camera 1 at a general position, the YZ plane becomes a vertical plane against a horizontal plane, and the Xs axis becomes a horizontal direction.

The pair of acceleration sensors Z1, Z2 is capable of detecting an up-and-down motion based on the camera shaking, which is called shaking in a pitching direction as shown in the direction of an arrow in FIG. 1(a). The pair of the acceleration sensors Z1, Z2 is located apart from each other at a predetermined distance in the optical direction. The pair of accelerator sensors Z1, Z2 detects the tilt around an axis in parallel with the Xs axis.

Similarly, the pair of acceleration sensors X1, X2 is capable of detecting a side-to-side motion based on the camera shaking, which is called shaking in a yawing direction as shown in the direction of an arrow in FIG. 1(a). The pair of the acceleration sensors X1, X2 is located apart from each other at a predetermined distance in the Xs direction. The pair of acceleration sensors X1, X2 detects the rotation around an axis in parallel with the Ys axis.

Therefore, the two pairs of acceleration sensors Z1, Z2 and X1, X2 are capable of detecting the camera shaking corresponding to yawing and pitching which are susceptible to taking an image. Furthermore, the pair of acceleration sensors Y1, Y2 is capable of detecting rotation around the Zs axis of the camera shaking. The pair of the acceleration sensors Y1, Y2 is also located apart from each other at a predetermined distance in the Ys direction.

According to FIG. 1(a), the pair of acceleration sensors X1, X2 and the pair of acceleration sensors Y1, Y2 are shown outside of the camera body 10 for the sake of the explanation of the present embodiment. However, the real position of the above pairs of acceleration sensors X1, X2 and Y1, Y2 is in the camera body 10.

Figure 1B:
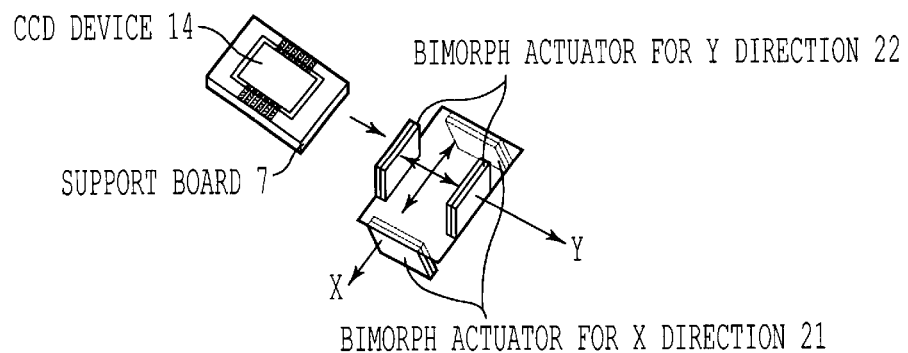
FIG. 1(b) shows a location between pairs of Bimorph actuators and a CCD device in the present invention.

Now referring to FIG. 1(b), the support board 7 is equipped with a pair of Bimorph actuators 22 for the Y direction and a pair of Bimorph actuators 21 for the X direction. The CCD device 14 is located on the top of the pairs of Bimorph actuators 21, 22 on an opposite side to the board 2. The position of the CCD device 14 is controlled based on the controller 6 equipped with the board 2. When the pair of Bimorph actuators 22 for the Y direction is driven, the CCD device 14 moves along the Ys direction. When the pair of Bimorph actuators 21 for the X direction is driven, the CCD device 14 moves along the Xs direction.

Figure 2:
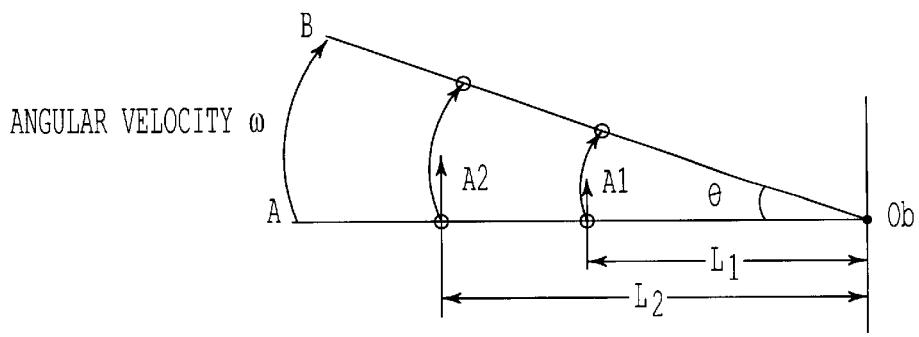
FIG. 2 is a cross-sectional view of a relation between outputs of acceleration sensors and a tilt angle according to the present invention.

Now referring to FIG. 2, the pair of acceleration sensors Z1, Z2 detects the camera shaking in the pitching direction according to the camera shaking. FIG. 2 shows a drawing of a cross-section of the YZ plane.

When the camera body 10 is inclined at an angle θ toward Ob in the YZ plane as a result of up-and-down motion of the camera, the output of the acceleration sensor Z1 is acceleration A1 at a distance L1' from Ob, and the output of the acceleration sensor Z2 is acceleration A2 at a distance L2' from Ob. The accelerations A1 and A2 are described in the following equations (1) and (2). In the equations (1), (2), ω is rotation angular velocity, and t is time.

$$A1 = L'_1\left(\frac{d\omega}{dt}\right) \quad (1)$$

$$A2 = L'_2\left(\frac{d\omega}{dt}\right) \quad (2)$$

When equation (1) is subtracted from equation (2).

$$A2 - A1 = \left(\frac{d\omega}{dt}\right)(L'_2 - L'_1) \quad (3)$$

The distance (L2'-L1') equals the distance between the position of acceleration sensor Z1 and one of the acceleration sensor X2 (L2-L1). The distance (L2-L1) is a predetermined unique value for each camera. Further, the subtraction of the accelerations (A2-A1) can be calculated based upon the output of the pair of the acceleration sensors Z1, Z2. Therefore, the angular acceleration (dω/dt) can be obtained from the above equations (1), (2), (3).

Proceeding to a next step, before the exposure is carried out, a position of the camera is defmed as an initial position and an initial time is defined as t=0 at the initial position. During exposure, the angular acceleration (dω/dt) is integrated with respect to t between every time interval, which are divided plural time sectors from t=0 to the total exposure time period. The angular velocity ω and the rotation angle θ is then calculated.

A camera shaking by rotation around an axis in parallel with the Ys axis based on the side-to-side motion of the camera is similarly calculated based upon the output of the pair of acceleration sensors X1, X2.

Figure 3A:
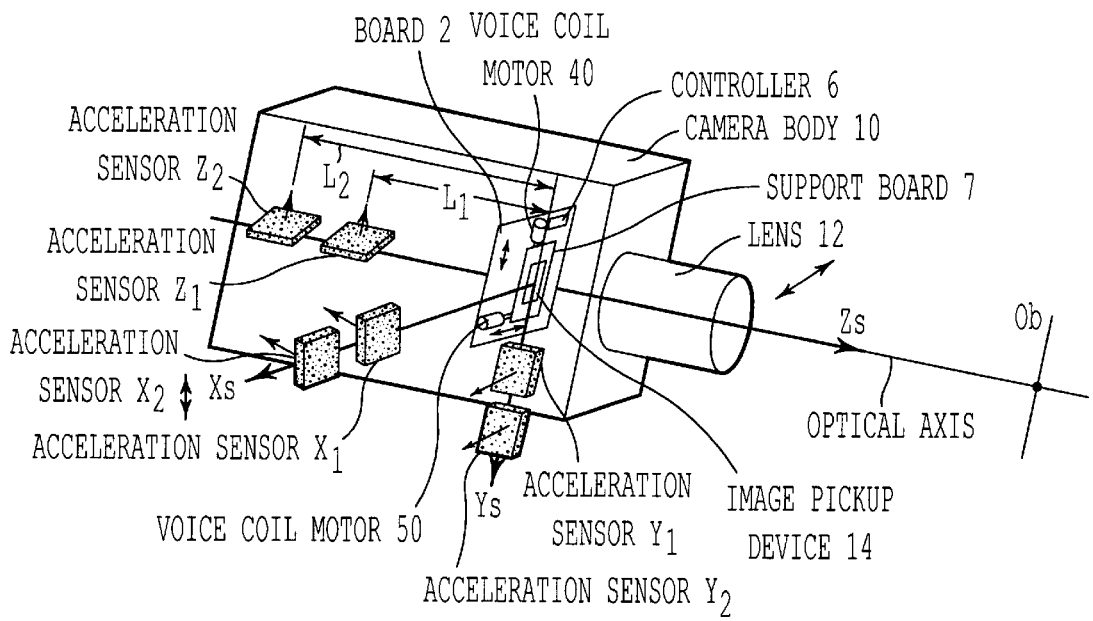
FIG. 3(a) is a perspective view of a camera according to a second embodiment of the present invention.
Figure 3B:
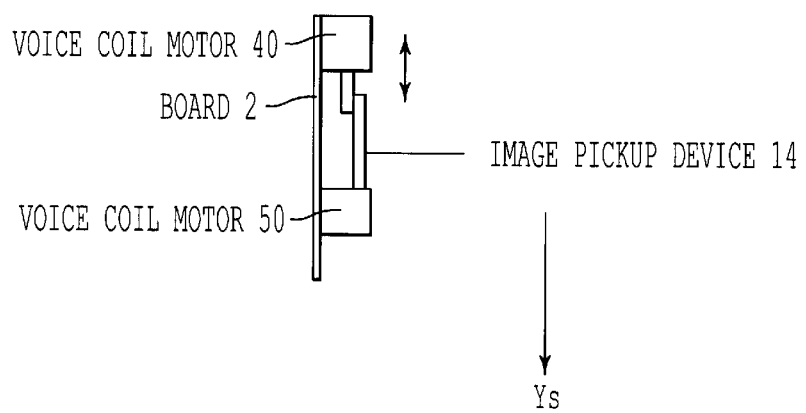
FIG. 3(b) is a cross-sectional view of an actuator for the CCD in the second embodiment of the present invention.

Now referring to FIG. 3(a), a second embodiment in which a pair of voice coil motors 40, 50 is employed as actuators for driving the CCD 14 is described. A voice coil motor 40 is a driver for the position in the Ys direction of the CCD 14. The other voice coil motor 50 is a driver for the position in the Xs direction of the CCD 14. Both voice coil motors 40, 50 are attached with the support board 7 and adjust the position of the CCD 14 via the support board 7 under control of the controller 6 as shown FIG. 3(b). The other elements in FIG. 3(a) are the same as in the first embodiment, and therefore a redundant explanation except to the pair of the voice coil motors 40, 50 has been omitted.

Figure 4:
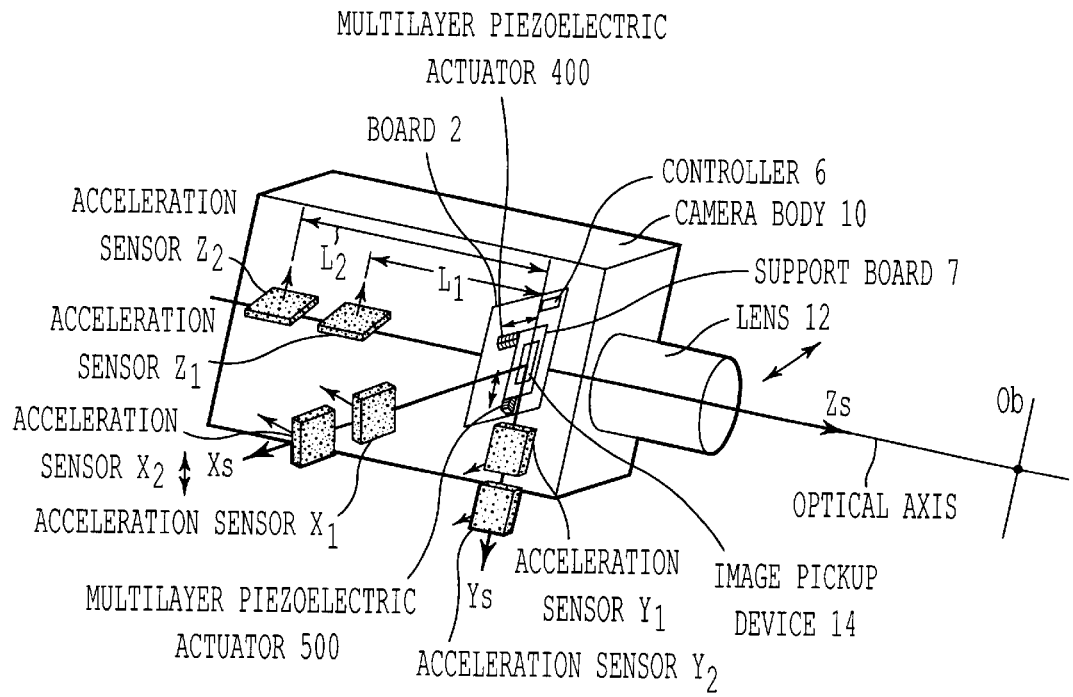
FIG. 4 is a perspective view of a camera according to a third embodiment of the present invention.

Now referring to FIG. 4, a third embodiment in which a pair of multilayer piezoelectric actuators 400, 500 is employed as actuators for driving the CCD 14 is described. The multilayer piezoelectric actuator 400 is a driver for the position in the Xs direction of the CCD 14. The other multilayer piezoelectric actuator 500 is a driver for the position in the Ys direction of the CCD 14. Both multilayer piezoelectric actuators 400, 500 are also attached with the support board 7 and adjust the position of the CCD 14 via the support board 7 under control of the controller 6. The other elements in FIG. 4(a) are the same as in the first embodiment, and therefore a redundant explanation except of the pairs of the multilayer piezoelectric actuators 400, 500 has been omitted.

Figure 5:
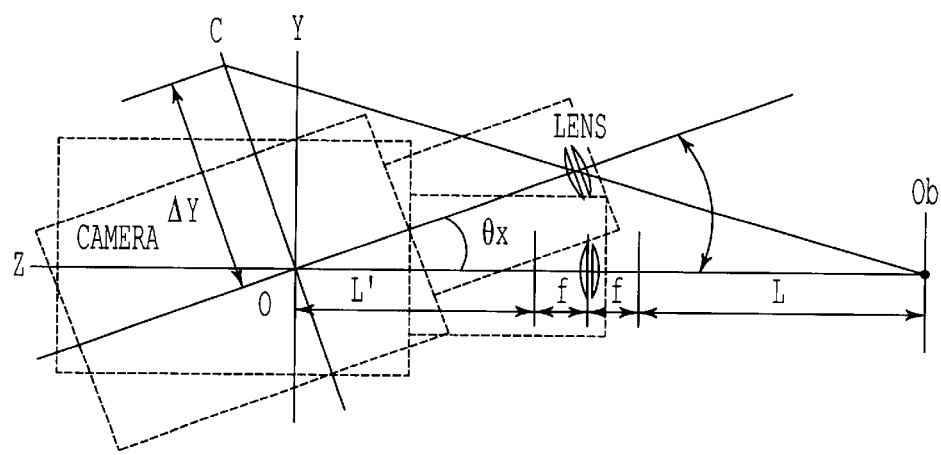
FIG. 5 is a cross-sectional view of a location of a camera body when a camera shakes around an Xs axis.

Now referring to FIG. 5, when a rotation θX around an axis in parallel with the Xs axis occurs as a result of the camera shaking, a focus point of the object moves out from an initial point O to a point C.

The amount of deviation between the initial point O and the point C is defined as ΔY. The focus distance of the lens 12 is f. The distance L' is a distance between the focus point of the lens 12 and the image focusing point in the CCD 14. The distance L is a distance between the focus point of the lens 12 and the point of the object. A detail of the explanation of the distances L, L' is described in "Point To Note and How to Use of Optical Device in Order to Use the Optelectronics Technique", by Tetsuo Sueda, Optelectronics, P36–37, the contents of this reference being incorporated herein by reference.

A scaling β is defined as β=f/L. And, L'=f²/L.

$$\Delta Y = (1+\beta)^2 \cdot \theta x \cdot f \tag{4}$$

The following equation is derived from the above equation (4) differentiated with respect to time t.

$$\frac{d(\Delta Y)}{dt} = (1+\beta)^2 \cdot f \cdot \left(\frac{d\theta x}{dt}\right) \tag{5}$$

Similarly, the equation (6) is also derived from an equation differentiated with respect to time t when a rotation θy around an axis in parallel with the Ys axis occurs as a result of the camera shaking, a focus point of the object moves out from the initial point O to point C.

$$\frac{d(\Delta X)}{dt} = (1+\beta)^2 \cdot f \cdot \left(\frac{d\theta y}{dt}\right) \tag{6}$$

The vales dθx/dt and dθy/dt can be derived from the integrated value of the dω/dt in the equations (1) and (2). Therefore, the values ΔX and ΔY are derived from the above equations.

The values ΔX and ΔY are values that the distance of the image focusing point in the CCD 14 should be corrected by the adjustment of the position of the CCD 14, or the optical system.

Figure 6:
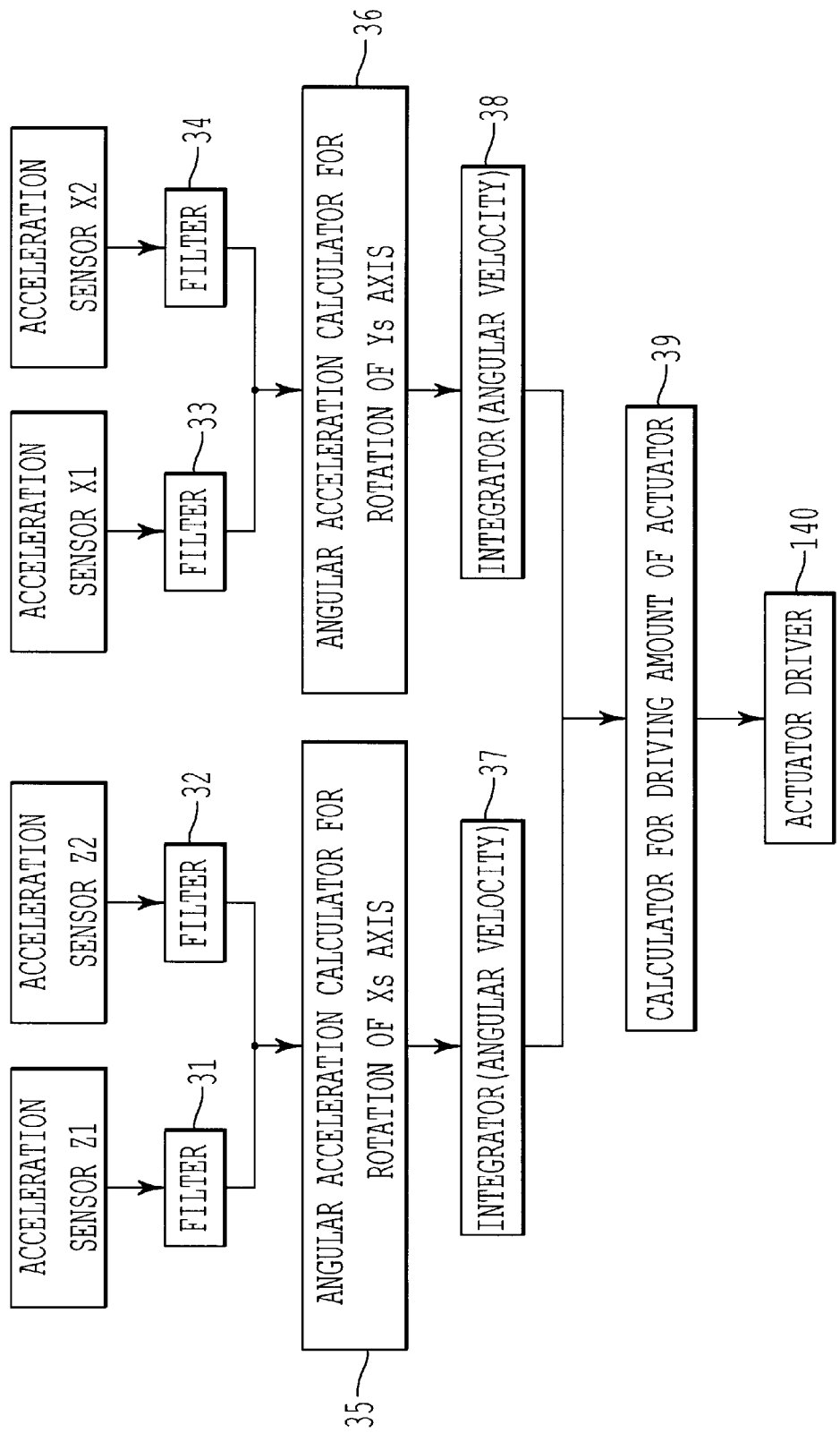
FIG. 6 is a block diagram for correcting a camera shaking according to the present invention.

Now referring to FIG. 6, the outputs of the pair of the acceleration sensors Z1, Z2 are input to filters 31, 32. The filters 31, 32 are made up of a low pass filter and a high pass filter. The high pass filter cuts a DC (direct current) component corresponding to the component of the gravity acceleration. The high pass filter is capable of reducing the offset noise at the position that the camera stands still. As another solution for reducing the offset noise at the position that the camera stands still, the system can detect the DC component of the camera shaking detector, and then subtract the DC component which is defined as the offset value from the detected signals.

The low pass filter of filters 31, 32 cuts the component of the frequency more than 20 Hz in the output of the acceleration sensors.

A similar structure is employed for filters 33, 34 which receive outputs from the accelerator sensors X1, X2.

Figure 7A:
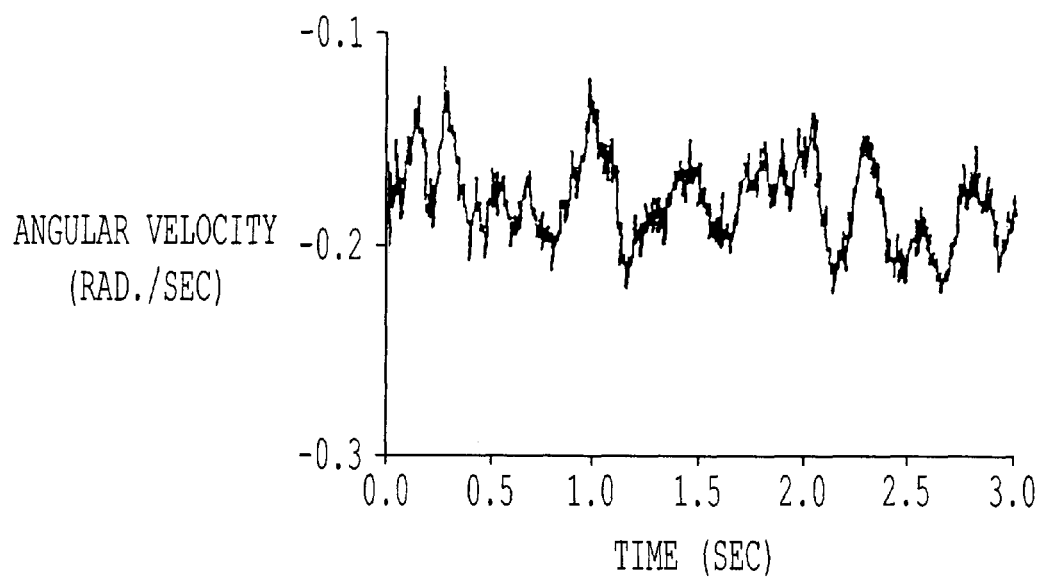
FIG. 7(a) is a spectrum of detected acceleration by acceleration sensors in the present invention.
Figure 7B:
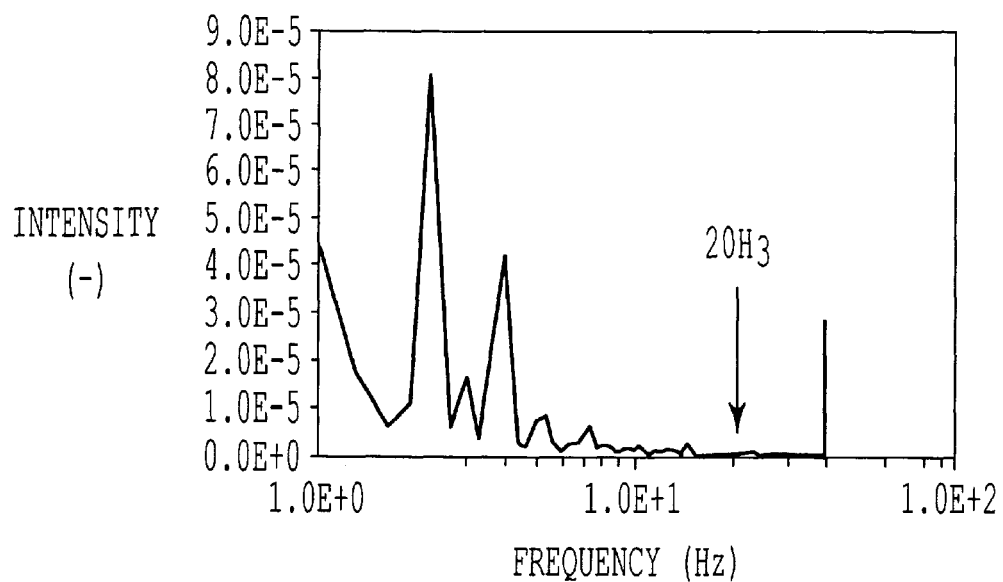
FIG. 7(b) is a spectrum of frequency when a camera shaking occurs.

Referring to FIGS. 7(a) and 7(b), when the camera body is made of aluminum, the general deviation of the angular velocity according to time is described. The power spectrum corresponding to the deviation of the angular velocity is described in FIG. 7(b). The time deviation of the power spectrum of the angular velocity in the camera shaking depends on less than 20 Hz according to FIG. 7(b).

Therefore, when a frequency component greater than 20 Hz of the power spectrum is cut by the low pass filter of filters 31, 32, the filter reduces noise or undesired signals, and finally gains the desired signal for the correction of the camera shaking.

Still referring to FIG. 6, the acceleration values reduced by the undesired signals by each filter 31, 32, 33, 34 is input to angular acceleration calculators 35 and 36. Angular acceleration calculators 35, 36 calculate the angular acceleration based upon the above equations. Each calculated angular acceleration is input in integrators 37 and 38. The integrators 37 and 38 integrate the angular acceleration into angular velocity based upon the above equations and further integrate the angular velocity into angles.

A correction calculator 39 inputs the calculated angular velocity and the angle, and calculates the amount of movement of the actuators. An actuator driver 140 drives actuators according to the above amount of movement.

Finally, the CCD 14 is adjusted to the proper positioning based on the driving of the actuators.

Figure 8:
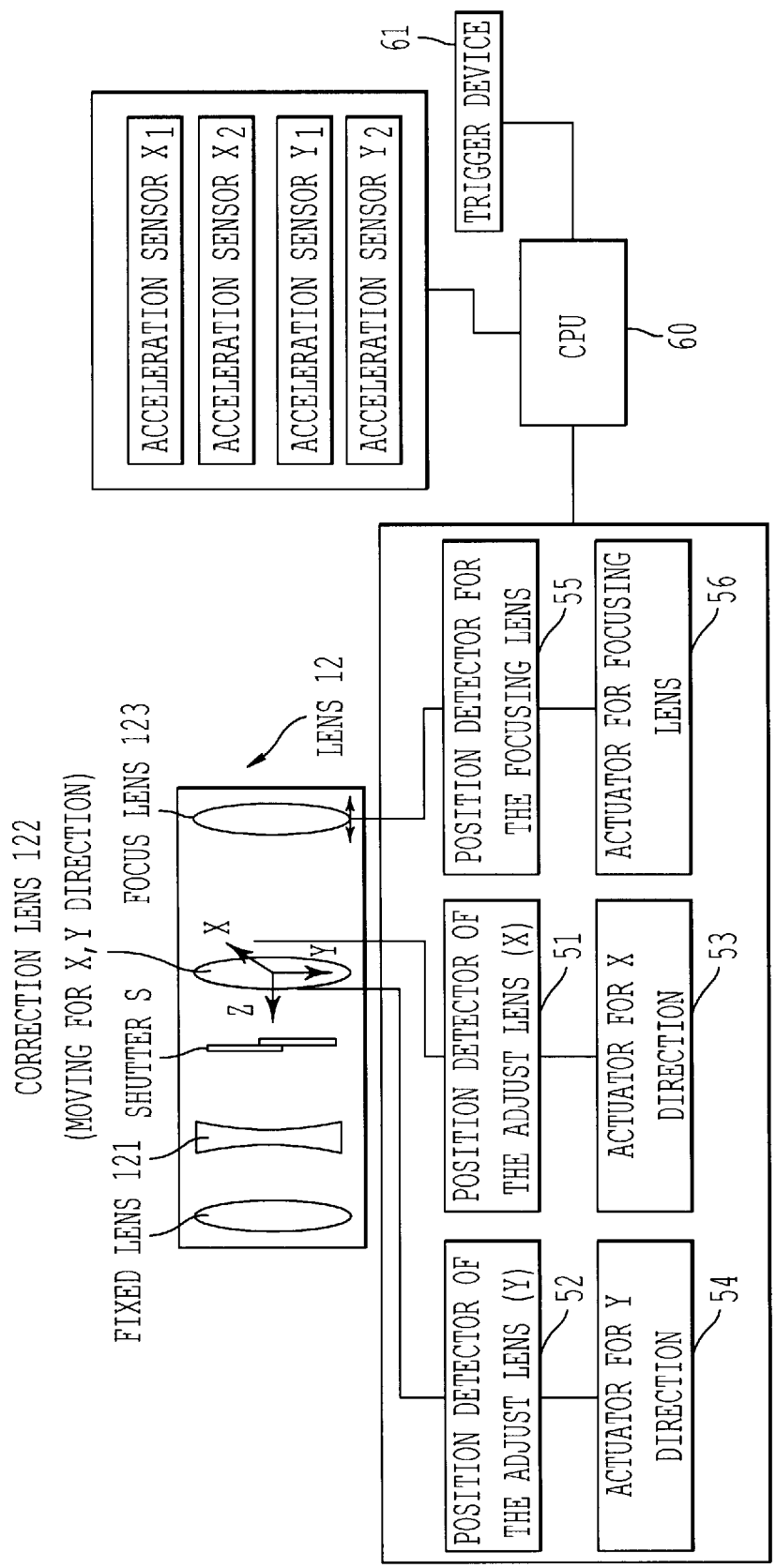
FIG. 8 is a block diagram for a total system in which a position of a correction lens is adjusted when camera shaking occurs.

Now referring to FIG. 8, the lens 12 may be formed of a fixed lens 121, a shutter S, a correction lens 122, and a focus lens 123. The focus lens 123 is held in the lens 12, and can move toward the optical axis. After an actuator 56 moves the focus lens 123 along the optical axis, a position detector 55 detects the position of the focus lens 123 on the optical axis. The detected position data of the focus lens 123 is forwarded to a CPU 60. The CPU 60 then controls the position of the focus lens 123 according to control programs.

The correction lens 122 is a lens for adjustment of the camera shaking and is capable of moving within the XY plane that is perpendicular to the optical axis. An actuator 53 moves the correction lens 122 toward the Xs axis. An actuator 54 also moves the correction lens 122 toward the Ys axis. The position detectors 51 and 52 can detect the position of the correction lens 122 after adjustment.

The actuators 53, 54 and position detectors 51, 52 are a part of a mechanical potion for the correction of the camera shaking. The CPU 60 is a part of the controller 6. The controller 6 drives the actuators 53, 54, 56 according to the acceleration detected by the pairs of acceleration sensors Z1, Z2 and X1, X2 and position information of each position detector 51, 52, 55.

A trigger device 61, such as a shutter release button, generates a trigger signal when the shutter release button is pushed to a halfway position. When the trigger signal is generated, the controller inputs electric power into the acceleration sensors and the drivers of the actuators.

The acceleration sensors and the drivers only require the electric power during taking a shot. Therefore, the electric power supply controlled according to the trigger signal avoids electric power loss.

The above embodiment is also capable of employing a magnetostriction device or an ultrasound motor, as other examples.

Figure 9A:
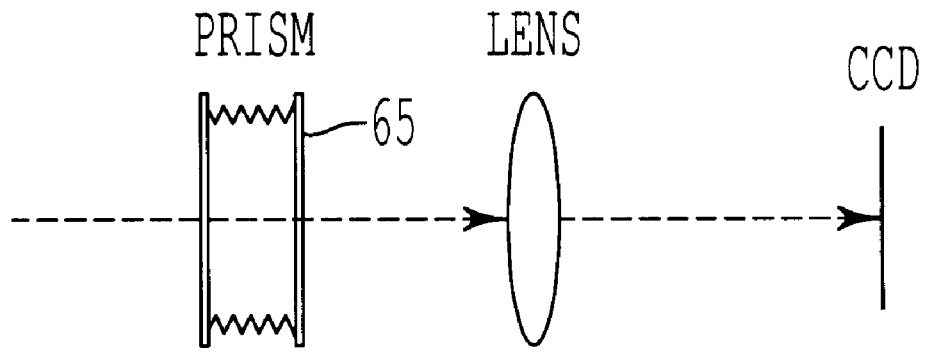
FIG. 9(a) is a cross-sectional view of an optical system in which a Vari-angle prism is employed when camera shaking does not occur.
Figure 9B:
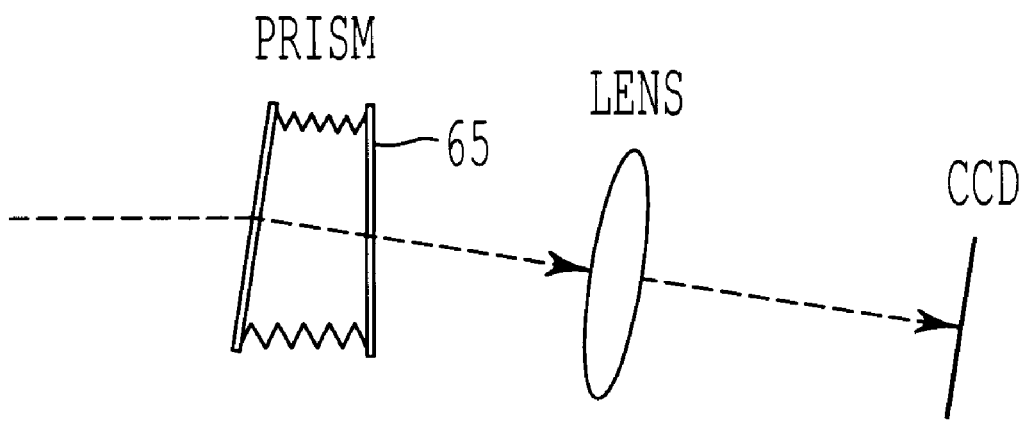
FIG. 9(b) is a cross-sectional view of an optical system in which a Vari-angle prism is employed when camera shaking does occur.

Now referring to FIGS. 9(a) and 9(b), a vari-angle prism 65 is located in the optical system on the optical axis. The vari-angle prism can control a variable rotation angle. The structure of the vari-angle prism 65 may be that two optically transparent boards are connected with an accordion device and sandwich a liquid with a high refractive index with the transparent boards. The controller controls the variable rotation angle of the prism 65 according to the camera shaking. One example of details of an explanation of the Vari-angle prism can be found in WWW site URL "http://www.usa.canon.com/indtech/broadcasteq/vaplens.html", the contents of this reference being incorporated herein by reference.

Still referring to FIG. 9(a), when the camera shaking does not occur, the variable rotation angle equals zero. When the camera shaking does occur, the variable rotation angle is controlled according to the detected acceleration, and calculated angular velocity and angle under control of the controller as shown FIG. 9(b).

Figure 10:
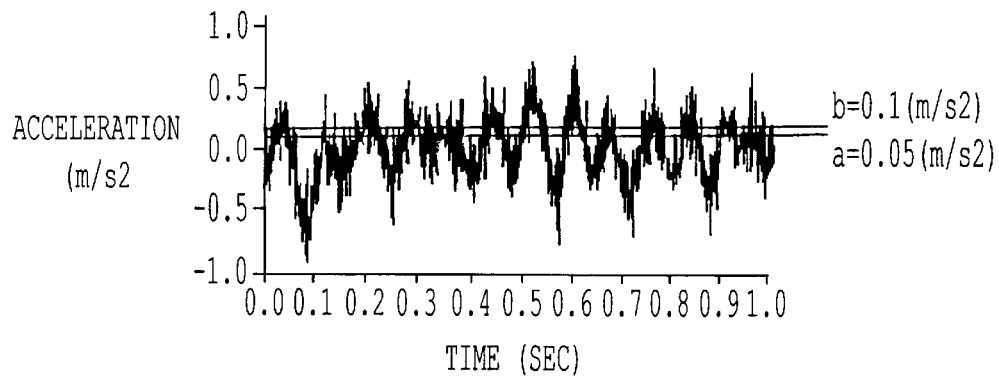
FIG. 10 is a spectrum of detected acceleration by acceleration sensors when camera shaking occurs.

Now referring to FIG. 10, the acceleration detected by the acceleration sensors varies with time.

According to knowledge obtained empirically, the range of the acceleration that the shooting is possible, even if the correction of the camera shaking is not carried out, is less than 0.05 m/S². Furthermore, the range of the acceleration that the shooting is possible by only camera parameters such as an aperture, shutter speed, zoom power, etc., are adjusted, is between 0.05 M/S² and 0.1 m/².

When the range of the acceleration exceeds 0.1 m/S², the camera needs the correction of the camera shaking.

Figure 11:
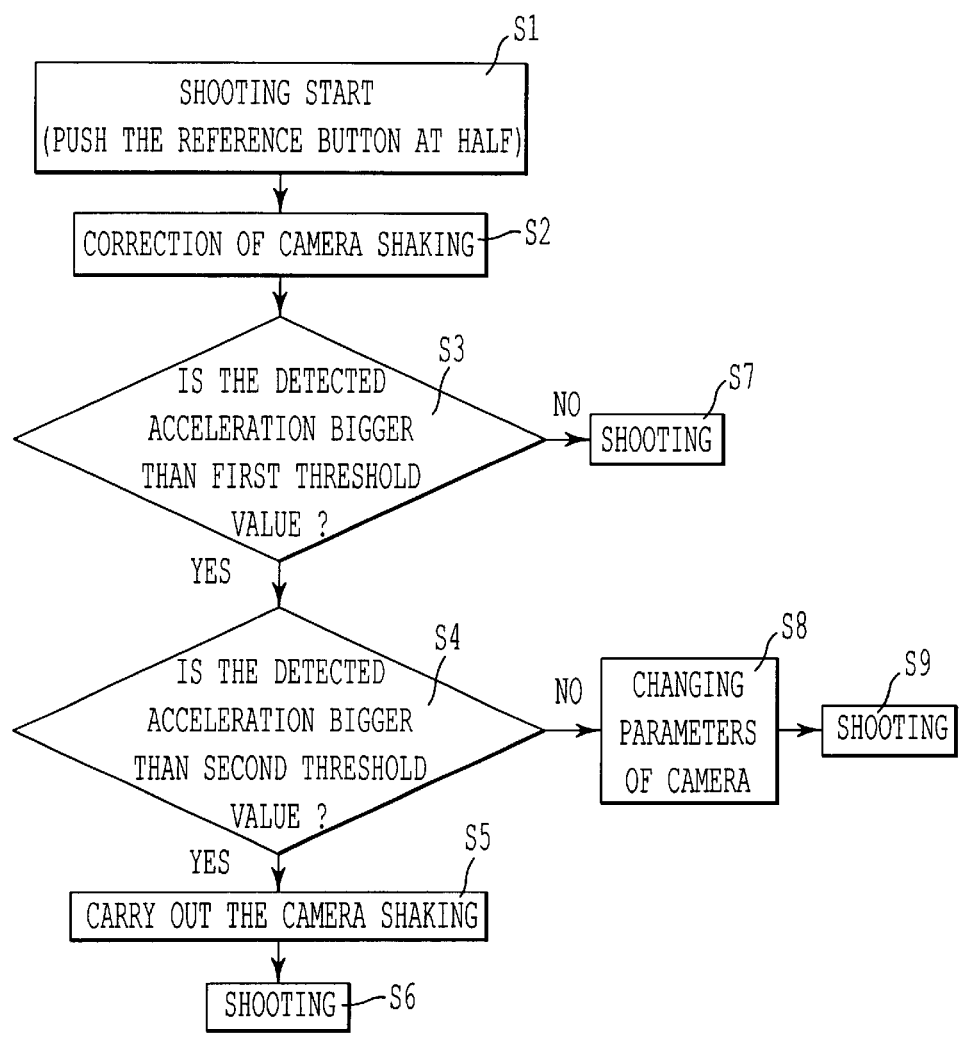
FIG. 11 is a flow chart for controlling correction of camera shaking based upon threshold values of acceleration.

Referring to FIG. 11, a flow chart describes a shooting operation with correction of the camera shaking.

At first, in a step S1, when the operator pushes a release button to a halfway position, the shooting is started. The operation then proceeds to a step S2, in which the correction of the camera shaking starts, and the process then proceed to a step S3. At step S3, the detected accelerations by the acceleration sensors are compared with a first threshold value (e.g. 0.05 m/s²). When the detected accelerations are greater than the first threshold value, the process proceeds to a step S4. When the detected accelerations are less than the first threshold value, the process proceeds to a step S7, and the shooting is carried out without the correction of the camera shaking.

At the step S4, the detected accelerations are further compared with a second threshold value (e.g. 0.1 m/s²). When the detected accelerations are greater than the second threshold value, the process proceeds to a step S5. When the detected acceleration is less than the second threshold value, the process proceeds to a step S8 and the camera parameters, such as shutter speed, zoom power, etc., are changed, and the process then proceeds to a step S9. At the step S9, the shooting is carried out.

At the step S5, the correction of the camera shaking is carried out and the process proceeds to a step S6. At the step S6, the shooting is carried out.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

The present document is based on Japanese priority document 10-180,488 filed in the Japanese Patent Office on Jun. 26, 1998, the entire contents of which are incorporated herein by reference.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An apparatus for detecting a deviation of a camera from shaking, the camera including a lens, comprising:
    a shaking detector configured to detect a shaking of the camera based upon an output from at least two pairs of acceleration sensors located on camera coordinate axes; and
    a calculator configured to calculate tilt angles of each of said axes based on the output of the at least two pairs of acceleration sensors, and based on a predetermined distance between individual acceleration sensors in said at least two pairs of acceleration sensors, and wherein an amount of the deviation $\Delta Y$ of the camera is calculated based on $$\Delta Y = (1+\beta)^2 \cdot \theta x \cdot f$$

in which $\beta$ is f/L wherein L is a distance from a focus point of the lens and a point of an object being imaged, $\theta x$ is a rotation of the camera, and f is a focus distance of the lens.

2. An apparatus for detecting a deviation of a camera from shaking according to claim 1, further comprising:
    a low pass filter configured to reject a frequency band over 20 Hz from the output of the at least two pairs of acceleration sensors.

3. An apparatus for detecting a deviation of a camera from shaking according to claim 1, wherein one of the axes of the camera coordinates is an optical axis of the camera.

4. An apparatus for detecting a deviation of a camera from shaking according to claim 3, wherein at least one of the at least two pairs of acceleration sensors is located on the optical axis of the camera.

5. An apparatus for detecting a deviation of a camera from shaking according to claim 4, wherein at least two pairs of the at least two pairs of acceleration sensors are located on a horizontal axis of the camera.

6. An apparatus for detecting a deviation of a camera from shaking according to claim 5, wherein a first pair of the at least two pairs of acceleration sensors is located on the optical axis of the camera to detect deviation in a vertical direction, and a second of the at least two pairs of acceleration sensors detects deviation in a horizontal direction.

7. An apparatus for detecting a deviation of a camera from shaking according to claim 1, further comprising:
    a deviation correcting device configured to correct the shaking of the camera based on the tilt angles calculated by the calculator.

8. An apparatus for detecting a deviation of a camera from shaking according to claim 3, further comprising:
    a low pass filter configured to reject a frequency band over 20 Hz from the output of the at least two pairs of acceleration sensors.

9. An apparatus for detecting a deviation of a camera from shaking according to claim 7, wherein the deviation correcting device adjusts a position of a lens in an optical system of the camera based on the tilt angles calculated by the calculator.

10. An apparatus for detecting a deviation of a camera from shaking according to claim 7, wherein the deviation correcting device adjusts a Vari-angle of a Vari-angle prism located on an optical axis of the camera based on the tilt angles calculated by the calculator.

11. An apparatus for detecting a deviation of a camera from shaking according to claim 7, wherein the deviation correcting device adjusts a position of an imaging sensor of the camera based on the tilt angles calculated by the calculator.

12. An apparatus for detecting a deviation of a camera including a lens from shaking, comprising:

detecting means for detecting a shaking of the camera based upon an output from at least two pairs of acceleration sensor means located on camera coordinate axes; and calculator means for calculating tilt angles of each of said axes based on the output of the at least two pairs of acceleration sensor means, and wherein an amount of the deviation ΔY of the camera is calculated based on $$\Delta Y = (1+\beta)^2 \cdot \theta x \cdot f$$

in which β is f/L wherein L is a distance from a focus point of the lens and a point of an object being imaged, θx is a rotation of the camera, and f is a focus distance of the lens.

13. An apparatus for detecting a deviation of a camera from shaking according to claim 12, further comprising:

low pass filter means for rejecting a frequency band over 20 Hz from the output of the at least two pairs of acceleration sensor means.

14. An apparatus for detecting a deviation of a camera from shaking according to claim 13, wherein one of the axes of the camera coordinates is an optical axis of the camera.

15. An apparatus for detecting a deviation of a camera from shaking according to claim 14, wherein at least one of the at least two pairs of acceleration sensor means is located on the optical axis of the camera.

16. An apparatus for detecting a deviation of a camera from shaking according to claim 15, wherein at least two pairs of the at least two pairs of acceleration sensor means are located on a horizontal axis of the camera.

17. An apparatus for detecting a deviation of a camera from shaking according to claim 16, wherein a first pair of the at least two pairs of acceleration sensor means is located on the optical axis of the camera to detect deviation in a vertical direction, and a second of the at least two pairs of acceleration sensor means detects deviation in a horizontal direction.

18. An apparatus for detecting a deviation of a camera from shaking according to claim 12, further comprising:

deviation correcting means for correcting the shaking of the camera based on the tilt angles calculated by the calculator means.

19. An apparatus for detecting a deviation of a camera from shaking according to claim 14, further comprising:

low pass filter means for rejecting a frequency band over 20 Hz from the output of the at least two pairs of acceleration sensor means.

20. An apparatus for detecting a deviation of a camera from shaking according to claim 18, wherein the deviation correcting means adjusts a position of a lens means in an optical system of the camera based on the tilt angles calculated by the calculator means.

21. An apparatus for detecting a deviation of a camera from shaking according to claim 18, wherein the deviation correcting means adjusts a Vari-angle of a Vari-angle prism means located on an optical axis of the camera based upon the tilt angles calculated by the calculator means.

22. An apparatus for detecting a deviation of a camera from shaking according to claim 18, wherein the deviation correcting means adjusts a position of an imaging means of the camera based on the tilt angles calculated by the calculator means.

\* \* \* \* \*